(12) United States Patent
Chaudhry et al.

(10) Patent No.: US 7,941,680 B2
(45) Date of Patent: May 10, 2011

(54) DISTRIBUTING INTEGRATED CIRCUIT NET POWER ACCURATELY IN POWER AND THERMAL ANALYSIS

(75) Inventors: Rajat Chaudhry, Austin, TX (US);
Daniel L. Stasiak, Austin, TX (US);
Michael F. Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 778 days.

(21) Appl. No.: 11/942,030

(22) Filed: Nov. 19, 2007

(65) Prior Publication Data

US 2009/0132834 A1    May 21, 2009

(51) Int. Cl.
*G06F 1/00* (2006.01)
*G06F 1/32* (2006.01)
*G06F 17/50* (2006.01)

(52) U.S. Cl. .................... 713/300; 713/320; 703/18
(58) Field of Classification Search .......... 713/300, 713/320
See application file for complete search history.

(56) References Cited

U.S. PATENT DOCUMENTS

| | | | |
|---|---|---|---|
| 5,696,694 A * | 12/1997 | Khouja et al. ............. 716/5 |
| 6,397,170 B1 | 5/2002 | Dean et al. | |
| 6,721,927 B2 * | 4/2004 | Croce et al. .............. 716/4 |
| 6,810,482 B1 | 10/2004 | Saxena et al. | |
| 6,865,722 B2 | 3/2005 | Chen et al. | |
| 7,120,888 B2 * | 10/2006 | Curtin et al. ............ 716/10 |
| 7,260,804 B1 * | 8/2007 | Burstein et al. ......... 716/12 |
| 7,343,499 B2 * | 3/2008 | Chaudhry et al. ....... 713/300 |
| 7,346,866 B2 * | 3/2008 | Chaudhry et al. ....... 716/4 |
| 7,353,490 B2 * | 4/2008 | Jiang et al. .............. 716/18 |
| 7,409,650 B2 * | 8/2008 | Oosuka et al. ........... 716/2 |
| 7,487,484 B2 * | 2/2009 | Curtin et al. ............ 716/6 |
| 7,503,025 B2 * | 3/2009 | Chaudhry et al. ....... 716/6 |
| 2004/0019859 A1 | 1/2004 | Ravi et al. | |

* cited by examiner

*Primary Examiner* — Suresh K Suryawanshi
(74) *Attorney, Agent, or Firm* — Francis Lammas; Stephen J. Walder, Jr.; Matthew B Talpis

(57) ABSTRACT

A method, system, and computer program product are provided for distributing net power accurately. A workload is simulated operating on an integrated circuit. Net switching activity is determined for a set of nets and a set of subnets in the integrated circuit. Net switching data is generated based on the net switching activity. A net power value is calculated for each individual net and each individual subnet using the net switching data and a net capacitance for each individual net or subnet. Each calculated net power value is assigned to one of a set of source devices that drives the individual net or subnet, wherein the net power is distributed accurately. A net power assignment list is generated based on the assigning of each net power value to one of the set of source devices that drives the individual net or subnet.

18 Claims, 5 Drawing Sheets

DISTRIBUTING INTEGRATED CIRCUIT NET POWER ACCURATELY IN POWER AND THERMAL ANALYSIS

BACKGROUND

1. Technical Field

The present application relates generally to an improved data processing system and method. More specifically, the present application is directed to distributing integrated circuit net power accurately in power and thermal analysis.

2. Description of Related Art

In order for a computing system to function properly, the computing system's environment must be kept within the operating specifications of the components within the computing system. Temperature is one of the most important environmental conditions for a computing system. Keeping the computing system cooled is a major design cost and possibly a high operating cost. Therefore, it is important to understand integrated circuit power consumption and heat generation. Integrated circuit power consumption and heat generation provides thermal designers important information needed to design a cooling solution that will work in the computing system at a lowest possible cost. Any error in integrated circuit power consumption and heat generation could drive the cooling design cost higher than necessary in the event too much cooling is provided or cause the computing system to operate improperly if not enough cooling is provided.

Most integrated circuit designs generate a power map with alternating current and direct current power distributed among different circuits or macros within the integrated circuit. A macro is a group of computing devices within the integrated circuit, which may be as large as thousands of devices or simply a single device. The generated power map is used in thermal simulation. A thermal simulation model includes computing system air temperature along with heatsink, package, and integrated circuit temperature transfer parameters. The thermal simulation model provides a hardware correlation; however, the thermal simulation model is still deficient in that thermal simulation models assign power used by the wires that connect the macros, commonly referred to as net power, proportionally across the macros of the integrated circuit.

Currently, progress has been made in power and thermal analysis. Power may be calculated on a cycle-by-cycle basis and detailed power maps may be created that are used in accurate power and thermal analysis models. These power and thermal analysis models provide an accurate understanding of the processor electrically and thermally early in the design cycle. However, current power and thermal analysis models fail to indicate an accurate distribution of net power which impacts the thermal analysis accuracy.

SUMMARY

The illustrative embodiments individually track the net power and subnet power when buffering is required within an integrated circuit. Source devices for each net and subnet are identified by tracing through a detailed description of the integrated circuit. The net power is then assigned to the corresponding source device that drives the specific net or subnet. Then a power map plotter generates an accurate power map by using the location of every source device that is identified in a floor plan of the integrated circuit. Using the accurate power map an accurate thermal analysis map may be generated so that an accurate cooling solution may be provided.

The illustrative embodiments provide for distributing net power accurately. The illustrative embodiments simulate a workload operating on an integrated circuit and determine net switching activity for a set of nets and a set of subnets in the integrated circuit. The illustrative embodiments generate net switching data based on the net switching activity of the set of nets and the set of subnets. The illustrative embodiments calculate a net power value for each individual net and each individual subnet using the net switching data and a net capacitance for each individual net or subnet. The illustrative embodiments assign each net power value to one of a set of source devices that drives the individual net or subnet, wherein the net power is distributed accurately and generate a net power assignment list based on the assigning of each net power value to one of the set of source devices that drives the individual net or subnet.

Other illustrative embodiments determine macro switching activity for a set of macros in the integrated circuit and generate macro switching data based on the macro switching activity of the set of macros. The illustrative embodiments calculate a macro power value for each individual macro in the set of macros using the macro switching data thereby forming macro power data. The illustrative embodiments may also generate a floor plan of the integrated circuit and generate a power density map using the floor plan, the net power assignment list, and the macro power data.

Further illustrative embodiments perform thermal analysis of the integrated circuit using the power density map, generate thermal data based on the thermal analysis, and generate a thermal map using the thermal data. The illustrative embodiments may also analyze a voltage drop at a set of inputs to the integrated circuit, determine a voltage drop for a set of macros within the integrated circuit, and generate voltage drop data.

These and other features and advantages of the present invention will be described in, or will become apparent to those of ordinary skill in the art in view of, the following detailed description of the exemplary embodiments of the present invention.

In other illustrative embodiments, a computer program product comprising a computer useable medium having a computer readable program is provided. The computer readable program, when executed on a computing device, causes the computing device to perform various ones, and combinations of, the operations outlined above with regard to the method illustrative embodiment.

In yet another illustrative embodiment, a system is provided. The system may comprise a processor and a memory coupled to the processor. The memory may comprise instructions which, when executed by the processor, cause the processor to perform various ones, and combinations of, the operations outlined above with regard to the method illustrative embodiment.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
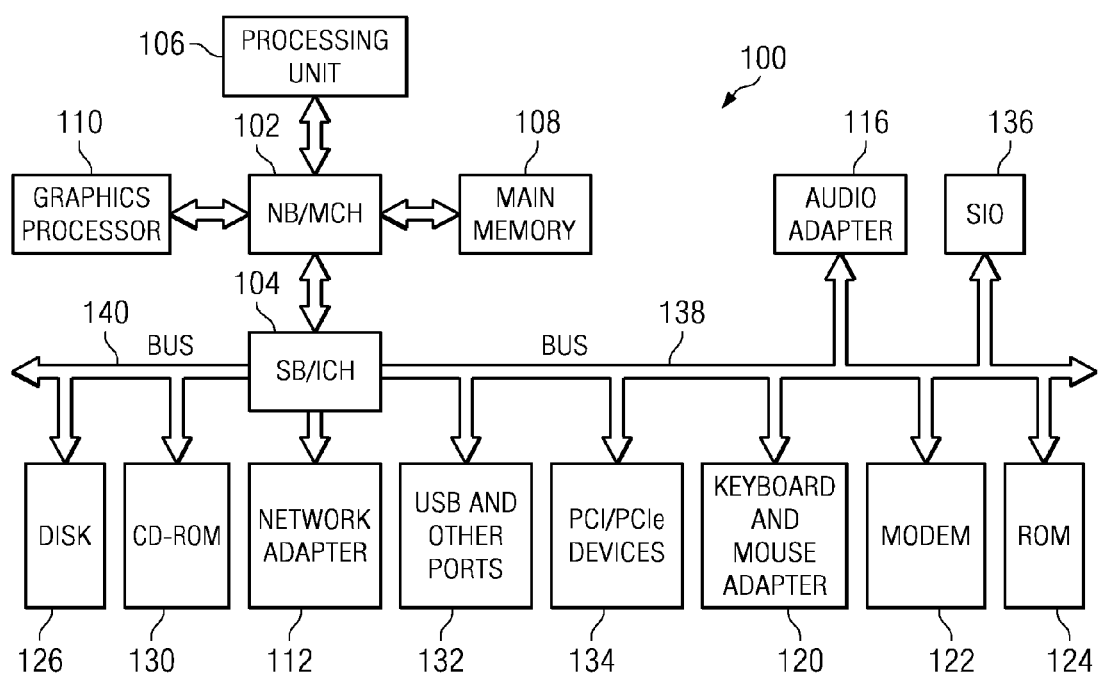
FIG. 1 is a block diagram of an exemplary data processing system in which aspects of the illustrative embodiments may be implemented.

The illustrative embodiments provide mechanisms for distributing net power accurately in power and thermal analysis. FIG. 1 is provided as an exemplary diagram of a data processing environment in which exemplary aspects of the illustrative embodiments of the present invention may be implemented. It should be appreciated that FIG. 1 is only exemplary and is not intended to state or imply any limitation with regard to the environments in which aspects or embodiments of the present invention may be implemented. Many modifications to the depicted environments may be made without departing from the spirit and scope of the present invention.

With reference now to FIG. 1, a block diagram of a data processing system is shown in which illustrative embodiments may be implemented. Data processing system 100 is an example of a computer in which computer usable code or instructions implementing the processes may be located for the illustrative embodiments.

In the depicted example, data processing system 100 employs a hub architecture including a north bridge and memory controller hub (MCH) 102 and a south bridge and input/output (I/O) controller hub (ICH) 104. Processing unit 106, main memory 108, and graphics processor 110 are coupled to north bridge and memory controller hub 102. Processing unit 106 may contain one or more processors and even may be implemented using one or more heterogeneous processor systems. Graphics processor 110 may be coupled to the MCH through an accelerated graphics port (AGP), for example.

In the depicted example, local area network (LAN) adapter 112 is coupled to south bridge and I/O controller hub 104 and audio adapter 116, keyboard and mouse adapter 120, modem 122, read only memory (ROM) 124, universal serial bus (USB) ports and other communications ports 132, and PCI/PCIe devices 134 are coupled to south bridge and I/O controller hub 104 through bus 138, and hard disk drive (HDD) 126 and CD-ROM drive 130 are coupled to south bridge and I/O controller hub 104 through bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be coupled to south bridge and I/O controller hub 104.

An operating system runs on processing unit 106 and coordinates and provides control of various components within data processing system 100 in FIG. 1. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 100. Java and all Java-based trademarks are trademarks of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processing unit 106. The processes of the illustrative embodiments may be performed by processing unit 106 using computer implemented instructions, which may be located in a memory such as, for example, main memory 108, read only memory 124, or in one or more peripheral devices.

The hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system.

In some illustrative examples, a bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted examples in FIG. 1 and above-described examples are not meant to imply architectural limitations. For example, data processing system 100 also may be a tablet computer, laptop computer, telephone device, a personal digital assistant (PDA), or the like.

In performing power and thermal analysis of the logic associated with an integrated circuit, power calculators calculate the alternating current (AC) and direct current (DC) power used by macros and a power map plotter generates a power map. As stated previously, a macro is a group of computing devices within the integrated circuit, which may be as large as thousands of devices or a single device. However, wires, also referred to as nets, that connect the various macros together also dissipate power, which is known as net power. In prior methods, this net power was distributed proportionally over the macros. Since the nets that connect the macros together may be sufficiently long enough to require buffering, the net power that was previously assigned proportionally over the macros may be incorrectly assigned when thermal analysis is performed. On the other hand, the illustrative embodiments individually track the net power and subnet power when buffering is required within an integrated circuit. Subnets are the nets between a macro and a buffer, a buffer and another buffer, or a buffer and a macro. Source devices for each net and subnet are identified by tracing through a detailed description of the integrated circuit. The net power is then assigned to the corresponding source device that drives the net or subnet. Then a power map plotter generates an accurate power map by using the location of every source device that is identified in a floor plan of the integrated circuit.

Using the accurate power map an accurate thermal analysis map may be generated so that an accurate cooling solution may be provided.

Figure 2:
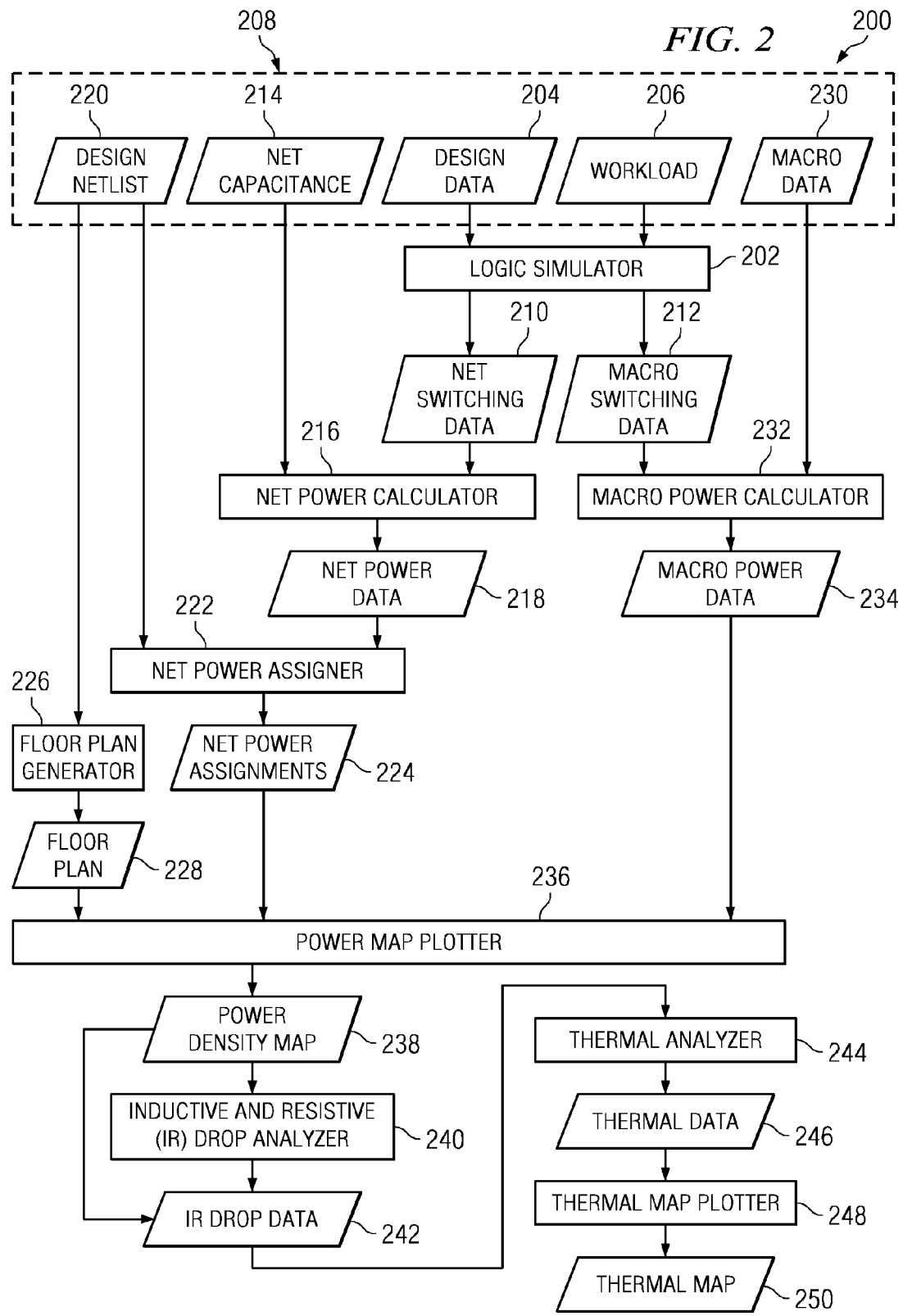
FIG. 2 depicts an exemplary functional block diagram of a net and subnet power distributing system in accordance with an illustrative embodiment.

FIG. 2 depicts an exemplary functional block diagram of a net and subnet power distributing system in accordance with an illustrative embodiment. In net and subnet power distributing system 200, logic simulator 202 receives design data 204 and workload 206 as input. Design data 204 is data that is written in a design language that describes how the logic of the integrated circuit operates. Workload 206 is an application that would operate using the logic of the integrated circuit. Design data 204 and workload 206 are part of input data 208 that is used by net and subnet power distributing system 200 to distribute net and subnet power accurately in power and thermal analysis. Logic simulator 202 simulates workload 206 operating on the integrated circuit using design data 204 to determine the switching activity of the integrated circuit. The logic simulator determines the switching activity of the integrated circuit by using the switching activity of the circuit inputs. The percentage of input signals that switch indicates the switching activity of the integrated circuit. Switching activity is defined as the number of 0 to 1 and 1 to 0 transitions of the various macros, nets, and subnets of the integrated circuit, normalized by the operating frequency.

In determining the switching activity of nets and subnets, logic simulator 202 generates net switching data 210 and macro switching data 212. The logic simulator generates the net switching activity by analyzing the state of each net and subnet at every cycle boundary and determining if the net or subnet has switched from the previous cycle. Net switching data 210 is data that indicates how often the logic of each specific net or subnet between macros and/or buffers switches from 0 to 1 and 1 to 0 normalized by the operating frequency. Macro switching data 212 is data that indicates how often the logic of each specific macro switches from 0 to 1 and 1 to 0 normalized by the operating frequency. Net switching data 210 and macro switching data 212 may be stored in a storage device, such as main memory 108 of FIG. 1.

Net switching data 210 is used in conjunction with net capacitance 214 by net power calculator 216 to calculate the power used by each net and subnet in the integrated circuit and generate net power data 218. Net capacitance 214 is the capacitance of each net and subnet determined by how often the net or subnet is charged and discharged, that is, how the net and subnet changes from high to low and low to high. Net power calculator 216 uses the following function to calculate the net power (NP) in watts for each net and subnet: $NP = \frac{1}{2} C V^2 F \, sf$. In this function, C is the capacitance for the net or subnet, V is the voltage used at each net or subnet, F is the clock frequency of the integrated circuit, and sf is the switching factor of the net or subnet. Net power data 218 is used in conjunction with design netlist 220 by net power assigner 222 to assign the individually calculated net power to the source device that drives the specific net or subnet. Design netlist 220 is a detailed description of the devices of the integrated circuit. Net power assigner 222 stores the assignments as net power assignments 224. Design netlist 220 is also used by floor plan generator 226 to generate floor plan 228 of the integrated circuit. Floor plan generator 226 generates floor plan 228, which is a two-dimensional or three-dimensional floor plan of each layer of the integrated circuit.

As discussed above, logic simulator 202 also generates macro switching data 212, which is data that indicates how often the logic of each specific macro switches from high to low and low to high normalized by the operating frequency. Macro switching data 212 is used in conjunction with macro data 230, which defines how the macro operates, by macro power calculator 232 to calculate the power used by each macro in the integrated circuit and generate macro power data 234. Macro power calculator 232 uses the following function to calculate the macro power (MP) in watts for each macro: $MP = \frac{1}{2} C V^2 F \, sf$. In this function, C is the total macro switching capacitance for internal macro nets and capacitance for transistor devices, V is the voltage used at each macro, F is the clock frequency of the integrated circuit, and sf is the switching factor of the macro.

Floor plan 228, net power assignments 224, and macro power data 234 are used by power map plotter 236 to plot power density map 238, which may be either a two-dimensional or three-dimensional map, that represents the power used by each macro and each source device associated with the net power assignments. Inductive and resistive (IR) drop analyzer 240 analyzes the voltage drop at each input, whether voltage input (Vdd) or ground (GND), to the integrated circuit and generates voltage drop data 242. Inductive and resistive (IR) drop analyzer 240 performs the voltage drop analysis using, for example, power density map 238 of the integrated circuit. Power density map 238 may indicate current (I) magnitude and location, a power grid of the integrated circuit, a controlled collapse chip connection (C4) pattern of the integrated circuit, wire resistance values, C4 resistance values, or the like. Inductive and resistive (IR) drop analyzer 240 determines the voltage drop that is measured across the C4 to each macro with the following function: $V\,drop = I*R$ where R is the resistance of the wires and/or the resistance of the C4. Inductive and resistive (IR) drop analyzer 240 may also perform inductive analysis using, for example, an integrated circuit package model that includes the current magnitude, switching rates of the macros along with current locations, a integrated circuit power supply capacitance, a power grid of the integrated circuit, a C4 pattern of integrated circuit, or the like. Integrated circuit package models may include, for example, the capacitance, resistance, inductive, or the like values of the integrated circuit. The environment outside of the package may include power supply and external decoupling capacitance (decap) and other components. Inductive and resistive (IR) drop analyzer 240 may use these inputs to determine how the power supply voltage will move up and down while the chip operates. Inductive and resistive (IR) drop analyzer 240 produces voltage drop data 242 of the voltage analysis that indicates how much voltage drop or collapse occurs.

Also using power density map 238, thermal analyzer 244 performs thermal analysis of the integrated circuit which generates thermal data 246. Thermal analysis may be performed by thermal analysis simulation software, such as HIEROH, FLOTHERM, or the like. Thermal analyzer 244 performs the thermal analysis using power density map 238 as stimulus along with, for example, an integrated circuit model, an integrated circuit package model, ambient air direction, flow, and temperature of the integrated circuit, a heat sink thermal model of the integrated circuit, a thermal resistance of compounds between the modules of the integrated circuits, or the like. Thermal analyzer 244 generates thermal data 246 which expresses the thermal characteristics of the integrated circuit given these inputs, one of which is expressed in FIG. 4 hereafter. Thermal map plotter 248 uses thermal data 246 to generate thermal map 250, which may be either a two-dimensional or three-dimensional map, of the integrated circuit. Thermal map 250 provides an accurate representation of the temperature at each source device within the integrated circuit.

Figure 3:
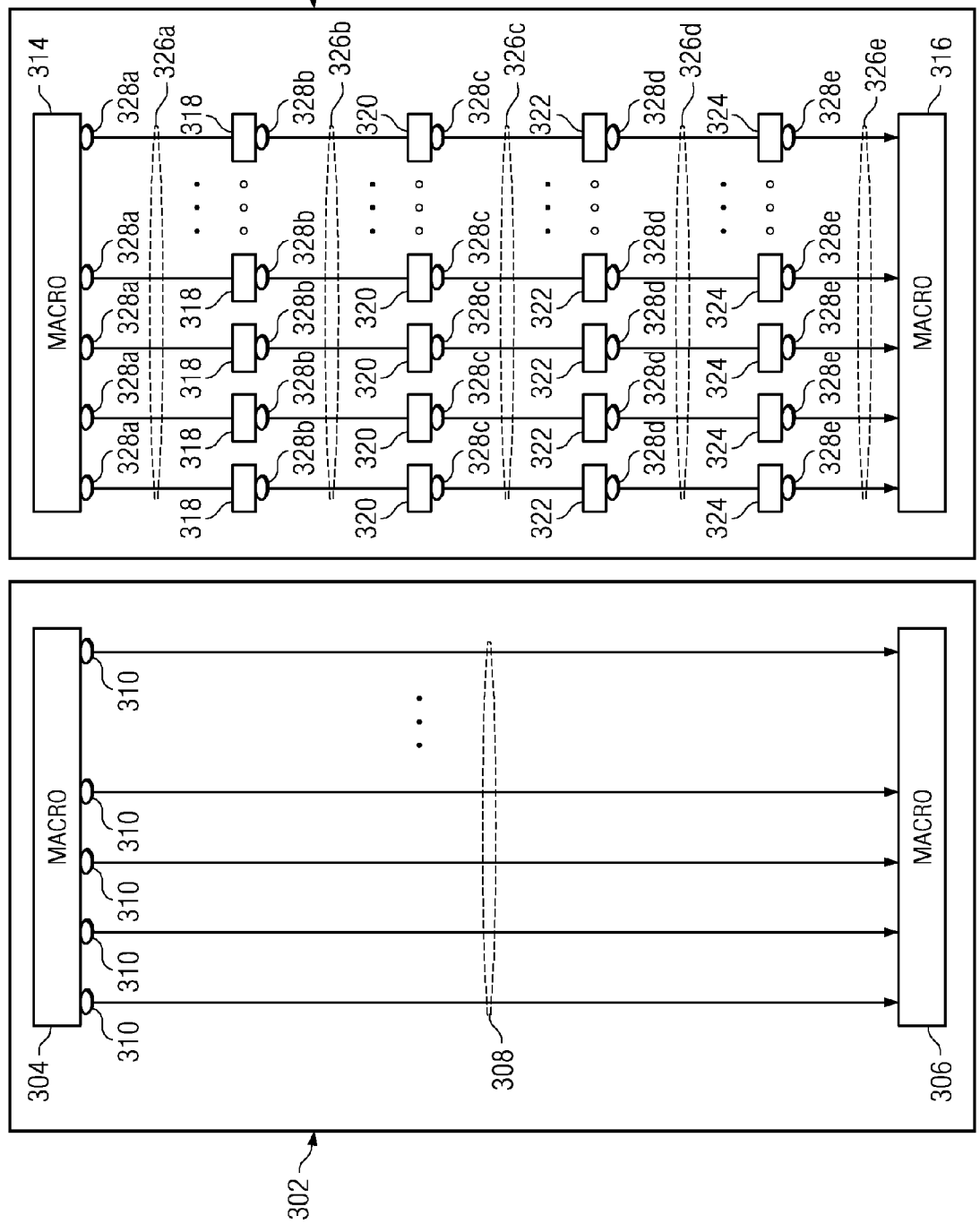
FIG. 3 depicts an exemplary illustration of assigning net power to the corresponding source device that drives the net or subnet in accordance with an illustrative embodiment.

Thus, the illustrative embodiments individually track the net power and subnet power when buffering is required within an integrated circuit. The source device for each net and subnet are identified by tracing through a detailed description of the integrated circuit. The net power is then assigned to the corresponding source device that drives the net or subnet. FIG. 3 depicts an exemplary illustration of assigning net power to the corresponding source device that drives the net or subnet in accordance with an illustrative embodiment. Integrated circuit 302 includes macro 304 and macro 306 which are connected by buses 308. As discussed above, in prior methods the power for each of buses 308 was not calculated and thus any power used by buses 308 is assigned proportionally to macro 304 and macro 306, shown as power assignments 310. However, buses 308 that connect macro 304 to macro 306 may be of a length that requires buffering. Thus, power assignments 310 may be false power assignments since macro 304 may not drive all of buses 308 and macro 306 does not drive any of buses 308 in the final design of the integrated circuit.

In comparison, integrated circuit 312 includes macro 314, macro 316, and buffers 318, 320, 322, and 324. Using the above described operation of a net power distributing system in FIG. 2, the net power is calculated for each of subnets 326a, 326b, 326c, 326d, and 326e that connects macro 314 to buffer 318, buffer 318 to buffer 320, buffer 320 to buffer 322, buffer 322 to buffer 324, and buffer 324 to macro 316. Then, the net power identified for each of subnets 326a, 326b, 326c, 326d, and 326e are assigned to the macro or buffer that drives the specific one of subnets 326a, 326b, 326c, 326d, or 326e indicated by power assignments 328a, 328b, 328c, 328d, or 328e. For example, the net power identified for subnet 326a is assigned to macro 314 that drives subnet 326a, thus, power assignment 328a is assigned to macro 314, the net power identified for subnet 328b is assigned to buffer 318 that drives subnet 326b, thus, power assignment 328b is assigned to buffer 318, and so on.

Figure 4:
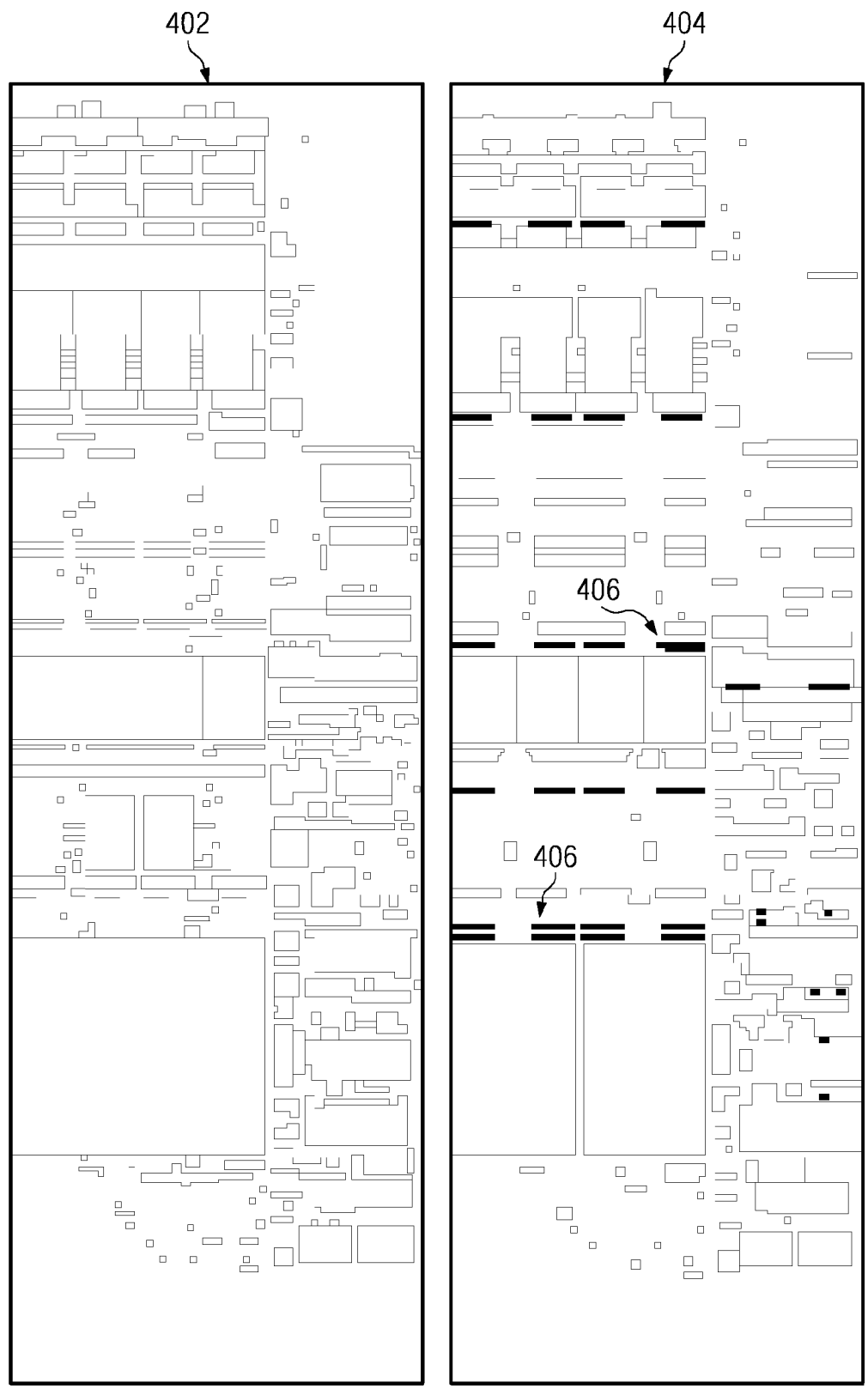
FIG. 4 depicts an exemplary comparison of power density within power density maps in accordance with an illustrative embodiment.

FIG. 4 depicts an exemplary comparison of power density within power density maps in accordance with an illustrative embodiment. In prior methods, power was assigned proportionally across the macros of the integrated circuit, as shown by power assignment 310 of FIG. 3. In power density map 402 distributing the power across the macros of the integrated circuit does not indicate any significant power consumption areas, which may be referred to as hot spots, thus, there is no additional need for cooling of the integrated circuit. In comparison, the use of a net power distributing system, such as net power distributing system 200 in FIG. 2, provides a more detailed analysis of the power consumed by macros and source devices that drive the various nets and subnets within an integrated circuit, which is shown in power density map 404. Power density map 404 indicates numerous hot spots 406 that exceed 2.5 watts per millimeter squared. Hot spots 406 are more clearly identified in power density map 404 because power is assigned to the source device driving the net and not assigned to the macro where the power is then distributed across the macro. When using this power density map 404 during thermal analysis, the thermal analysis improves by 2 degrees Celsius (or 20%) closer to the hardware data.

Figure 5:
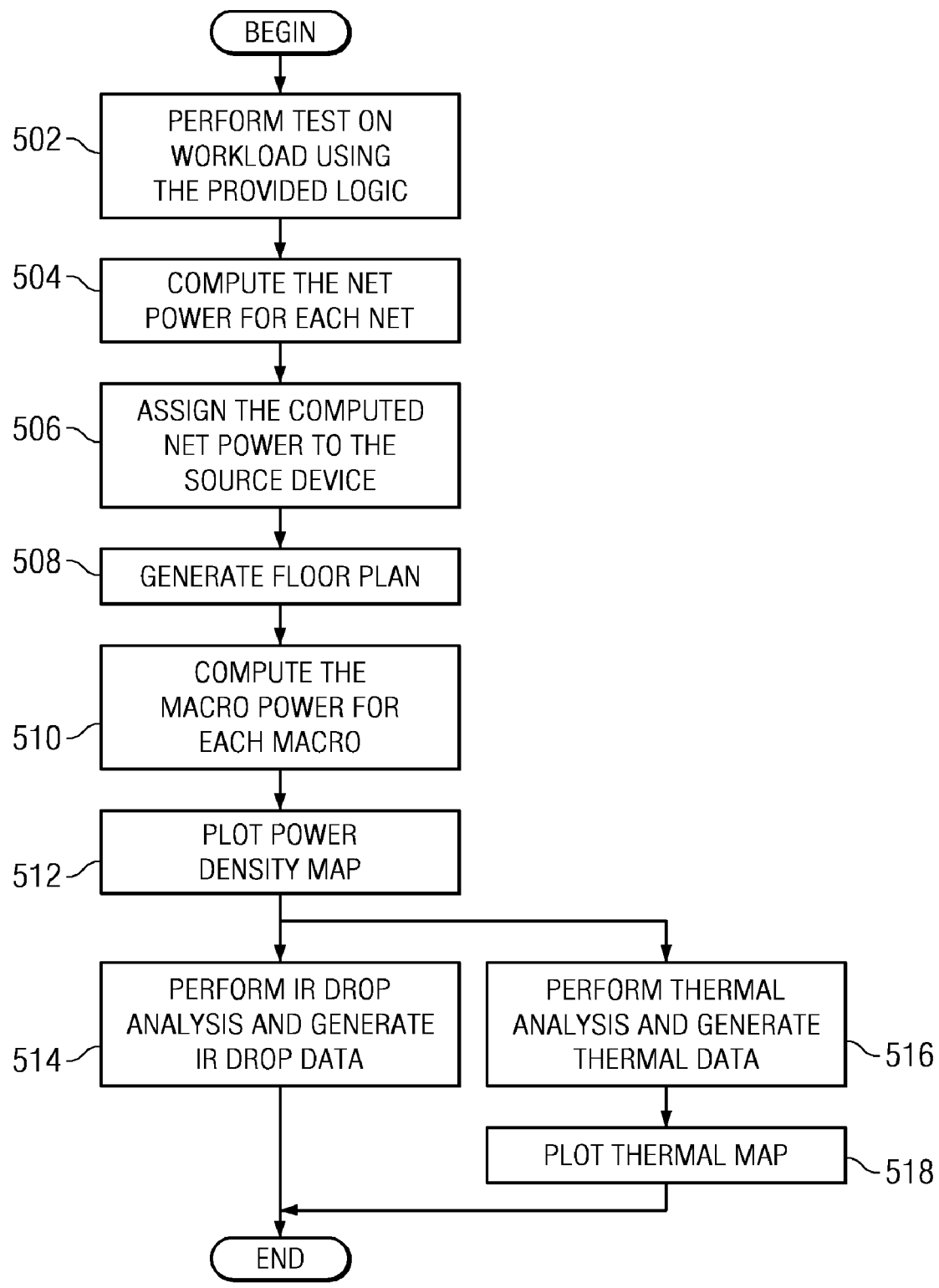
FIG. 5 depicts a flow diagram outlining an exemplary operation performed by a net and subnet power distributing system in accordance with an illustrative embodiment.

FIG. 5 depicts a flow diagram outlining an exemplary operation performed by a net and subnet power distributing system in accordance with an illustrative embodiment. As the operation begins, a logic simulator, such as logic simulator 202 of FIG. 2, simulates the logic of an integrated circuit using design data, which describes how the logic of the integrated circuit operates, and a workload, which is an application that would operate using the logic of the integrated circuit, to determine the switching activity of the integrated circuit (step 502). In determining the switching activity, the logic simulator generates net switching data and macro switching data. A net power calculator, such as net power calculator 216 of FIG. 2, uses the net switching data along with net capacitance to calculate the power used by each net and subnet in the integrated circuit and generate net power data (step 504). As stated previously, the net power is calculated using the following function to calculate the net power (NP) in watts for each net: $NP = \frac{1}{2} C V^2 F \, sf$.

A net power assigner, such as net power assigner 222 of FIG. 2, uses the net power data along with a design netlist to assign the individually calculated net power to the source device that drives the specific net or subnet (step 506). A floor plan generator, such as floor plan generator 226 of FIG. 2, also uses the design netlist to generate a floor plan, which is a two-dimensional or three-dimensional floor plan of each layer of the integrated circuit (step 508). A macro power calculator, such as macro power calculator 232 of FIG. 2, uses macro switching data, which is generated by the logic simulator, to calculate the power used by each macro in the integrated circuit and generate macro power data (step 510). The macro power calculator uses the following function to calculate the macro power (MP) in watts for each net: $MP = \frac{1}{2} C V^2 F \, sf$. Steps 508 and 510 may be performed in succession to steps 504 and 506 as shown in FIG. 5 or steps 508 and 510 may each be performed concurrently with the operations performed in steps 504 and 506 (not shown).

The floor plan, net power assignments, and macro power data are used by a power map plotter, such as power map plotter 236 of FIG. 2, to plot power density map (step 512). The power density map represents power usage by each macro and each net power source device assignment. From step 512, an IR drop analyzer, such as IR drop analyzer 240 of FIG. 2, analyzes the voltage drop at each input to the integrated circuit to determine a voltage drop for each macro within the integrated circuit and generates voltage drop data (step 514), with the operation ending thereafter. Also from step 512, a thermal analyzer, such as thermal analyzer 244 of FIG. 2, uses the voltage drop data and power density map to perform thermal analysis of the integrated circuit which generates thermal data (step 516). A thermal map plotter, such as thermal map plotter 248 of FIG. 2, uses the thermal data to generate a thermal map (step 518), with the operation ending thereafter. The thermal map provides an accurate representation of the temperature at each source device within the integrated circuit.

Thus, the illustrative embodiment provide for distributing net power accurately in power and thermal analysis. The illustrative embodiments simulate a workload operating on an integrated circuit and determine net switching activity for a set of nets and a set of subnets in the integrated circuit. The illustrative embodiments generate net switching data based on the net switching activity of the set of nets and the set of subnets. The illustrative embodiments calculate a net power value for each individual net and/or each individual subnet using the net switching data and a net capacitance for each individual net or subnet. The illustrative embodiments assign each net power value to one of a set of source devices that drives the individual net or subnet, wherein the net power is distributed accurately and generates a net power assignment list based on the assigning of each net power value to one of the set of source devices that drives the individual net or subnet.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for distributing net power accurately in an integrated circuit, the method comprising:
   determining net switching activity occurring in a set of nets and a set of subnets in the integrated circuit based upon a simulated workload;
   generating net switching data based on the net switching activity of the set of nets and the set of subnets;
   calculating a net power value for each individual net in the set of nets and each individual subnet in the set of subnets using the net switching data and a net capacitance for each individual net or subnet;
   assigning each net power value to one of a set of source devices that drives the individual net or subnet, wherein the net power is distributed accurately;
   generating a net power assignment list based on the assigning of each net power value to one of the set of source devices that drives the individual net or subnet;
   determining macro switching activity for a set of macros in the integrated circuit;
   generating macro switching data based on the macro switching activity of the set of macros; and
   calculating a macro power value for each individual macro in the set of macros using the macro switching data thereby forming macro power data.

2. The method of claim 1, further comprising:
   generating a floor plan of the integrated circuit; and
   generating a power density map using the floor plan, the net power assignment list, and the macro power data.

3. The method of claim 2, further comprising:
   performing thermal analysis of the integrated circuit using the power density map;
   generating thermal data based on the thermal analysis; and
   generating a thermal map using the thermal data.

4. The method of claim 2, further comprising:
   analyzing a first voltage drop at a set of inputs to the integrated circuit;
   determining a second voltage drop for a set of macros within the integrated circuit; and
   generating voltage drop data using the first voltage drop and the second voltage drop.

5. The method of claim 1, wherein calculating the net power value for each individual net in the set of nets and each individual subnet in the set of subnets uses a net power function and wherein the new power function is:

$$NP = \tfrac{1}{2} CV^2 Fsf$$

wherein C is a net capacitance for the individual net or subnet, V is a voltage used at the individual net or subnet, F is a clock frequency of the integrated circuit, and sf is a switching factor of the individual net or subnet.

6. The method of claim 1, wherein calculating the macro power value for each individual macro in the set of macros using the macro switching data to form macro power data uses a macro power function and wherein the macro power function is:

$$MP = \tfrac{1}{2} CV^2 Fsf$$

wherein C is a total macro switching capacitance for internal macro nets and capacitance for transistor devices, V is a voltage used at each macro, F is a clock frequency of the integrated circuit, and sf is a switching factor of the macro.

7. A computer program product comprising a non-transitory computer useable medium having a computer readable program, wherein the computer readable program, when executed in a data processing system, causes the data processing system to:
   determine net switching activity occurring in a set of nets and a set of subnets in an integrated circuit based upon a simulated workload;
   generate net switching data based on the net switching activity of the set of nets and the set of subnets;
   calculate a net power value for each individual net in the set of nets and each individual subnet in the set of subnets using the net switching data and a net capacitance for each individual net or subnet;
   assign each net power value to one of a set of source devices that drives the individual net or subnet, wherein the net power is distributed accurately;

generate a net power assignment list based on the assigning of each net power value to one of the set of source devices that drives the individual net or subnet;

determine macro switching activity for a set of macros in the integrated circuit;

generate macro switching data based on the macro switching activity of the set of macros; and calculate a macro power value for each individual macro in the set of macros using the macro switching data thereby forming macro power data.

8. The computer program product of claim 7, wherein the computer readable program further causes the data processing system to:

generate a floor plan of the integrated circuit; and generate a power density map using the floor plan, the net power assignment list, and the macro power data.

9. The computer program product of claim 8, wherein the computer readable program further causes the data processing system to:

perform thermal analysis of the integrated circuit using the power density map;

generate thermal data based on the thermal analysis; and generate a thermal map using the thermal data.

10. The computer program product of claim 8, wherein the computer readable program further causes the data processing system to:

analyze a first voltage drop at a set of inputs to the integrated circuit;

determine a second voltage drop for a set of macros within the integrated circuit; and generate voltage drop data using the first voltage drop and the second voltage drop.

11. The computer program product of claim 7, wherein the computer readable program to calculate the net power value for each individual net in the set of nets and each individual subnet in the set of subnets uses a net power function and wherein the new power function is:

$$NP=\tfrac{1}{2}CV^2Fsf$$

wherein C is a net capacitance for the individual net or subnet, V is a voltage used at the individual net or subnet, F is a clock frequency of the integrated circuit, and sf is a switching factor of the individual net or subnet.

12. The computer program product of claim 7, wherein the computer readable program to calculate the macro power value for each individual macro in the set of macros using the macro switching data to form macro power data uses a macro power function and wherein the macro power function is:

$$MP=\tfrac{1}{2}CV^2Fsf$$

wherein C is a total macro switching capacitance for internal macro nets and capacitance for transistor devices, V is a voltage used at each macro, F is a clock frequency of the integrated circuit, and sf is a switching factor of the macro.

13. A system, comprising:

a processor; and a memory coupled to the processor, wherein the memory comprises instructions which, when executed by the processor, cause the processor to:

determine net switching activity occurring in a set of nets and a set of subnets in a integrated circuit based upon a simulated workload;

generate net switching data based on the net switching activity of the set of nets and the set of subnets;

calculate a net power value for each individual net in the set of nets and each individual subnet in the set of subnets using the net switching data and a net capacitance for each individual net or subnet;

assign each net power value to one of a set of source devices that drives the individual net or subnet, wherein the net power is distributed accurately;

generate a net power assignment list based on the assigning of each net power value to one of the set of source devices that drives the individual net or subnet;

determine macro switching activity for a set of macros in the integrated circuit;

generate macro switching data based on the macro switching activity of the set of macros; and calculate a macro power value for each individual macro in the set of macros using the macro switching data thereby forming macro power data.

14. The system of claim 13, wherein the instructions further cause the processor to:

generate a floor plan of the integrated circuit; and generate a power density map using the floor plan, the net power assignment list, and the macro power data.

15. The system of claim 14, wherein the instructions further cause the processor to:

perform thermal analysis of the integrated circuit using the power density map;

generate thermal data based on the thermal analysis; and generate a thermal map using the thermal data.

16. The system of claim 14, wherein the instructions further cause the processor to:

analyze a first voltage drop at a set of inputs to the integrated circuit;

determine a second voltage drop for a set of macros within the integrated circuit; and generate voltage drop data using the first voltage drop and the second voltage drop.

17. The system of claim 13, wherein the instructions to calculate the net power value for each individual net in the set of nets and each individual subnet in the set of subnets uses a net power function and wherein the new power function is:

$$NP=\tfrac{1}{2}CV^2Fsf$$

wherein C is a net capacitance for the individual net or subnet, V is a voltage used at the individual net or subnet, F is a clock frequency of the integrated circuit, and sf is a switching factor of the individual net or subnet.

18. The system of claim 13, wherein the instructions to calculate the macro power value for each individual macro in the set of macros using the macro switching data to form macro power data uses a macro power function and wherein the macro power function is:

$$MP=\tfrac{1}{2}CV^2Fsf$$

wherein C is a total macro switching capacitance for internal macro nets and capacitance for transistor devices, V is a voltage used at each macro, F is a clock frequency of the integrated circuit, and sf is a switching factor of the macro.

* * * * *